United States Patent [19]

Dana et al.

[11] Patent Number: 5,091,465

[45] Date of Patent: Feb. 25, 1992

[54] GLASS FIBER SIZE

[75] Inventors: David E. Dana, Pittsburgh, Pa.; Tsao-Chin C. Huang, The Woodlands, Tex.; Enrico J. Pepe, Amawalk, N.Y.; Eric R. Pohl, Tarrytown, N.Y.; Shiu-Chin H. Su, Croton-on-Hudson, N.Y.

[73] Assignees: Union Carbide Chemicals and Plastics Company, Inc.; PPG Industries, Inc., both of Danbury, Conn.

[21] Appl. No.: 450,065

[22] Filed: Dec. 13, 1989

[51] Int. Cl.$^5$ .................. C08L 67/06; C08G 63/91
[52] U.S. Cl. .................. 524/588; 525/446; 525/447; 524/603; 524/604; 524/605
[58] Field of Search .................. 525/446; 524/588

[56] References Cited

U.S. PATENT DOCUMENTS

| | | |
|---|---|---|
| 3,539,441 | 11/1970 | Rabenold . |
| 3,936,285 | 2/1976 | Maaghul . |
| 4,049,865 | 9/1977 | Maaghul . |
| 4,122,074 | 10/1978 | Pepe et al. . |
| 4,163,073 | 7/1979 | Pepe et al. . |
| 4,273,694 | 6/1981 | Pepe et al. . |
| 4,340,520 | 7/1982 | Marsden et al. . |
| 4,429,082 | 1/1984 | Lee ................................. 525/426 |

OTHER PUBLICATIONS

Hack's Chemical Dictionary, p. 174, McGraw-Hill Book Co., NY, 1969.

*Primary Examiner*—Patricia Short
*Attorney, Agent, or Firm*—Bonnie L. Deppenbrock

[57] ABSTRACT

Silylated polyester resins comprising the acid salt of a Michael addition adduct of an aminoorganosilane and a conjugated unsaturated polyester resin containing a polyethylene oxide chain segment useful for sizing glass fiber reinforcement of polyester molding composites.

14 Claims, No Drawings

GLASS FIBER SIZE

BACKGROUND OF THE INVENTION

1. Field of the Invention

This invention relates to polymeric compositions useful for sizing or protecting siliceous materials, such as glass fibers used to reinforce organic resins and for promoting adhesion between the glass fiber reinforcement and organic resins, and particularly relates to compositions containing polyester aminoorganosilanes and/or their acid salts wherein the silane-modified polyesters include an effective level of polyalkylene glycol monomer units.

2. Description of Related Art

Glass strands, mats and roving are used widely to reinforce resinous molding compositions. Probably the biggest application concerns the reinforcement of thickened, polymerizable polyester resins.

Glass fiber strands are formed from numerous individual fine glass fibers generally produced by drawing molten glass through small orifices. As the fibers are being drawn, they typically are coated with a sizing composition to protect individual fibers from abrasion (lubrication) or other factors causing surface defects (corrosion), to facilitate the binding of multiple fibers into strands (binder) and to enhance the adhesion between the glass fiber reinforcement and the organic resin (compatibilization/coupling).

As the sized fibers are drawn and collected to form strands, the strands generally are wound onto a forming tube. Once the wound sized glass fiber strands have built up to the desired extent on the forming tube, the assembly or forming package is heated in an oven, sometimes under a reduced pressure, to dry and cure the sizing.

U.S. Pat. No. 3,936,285 discloses a composition suitable for sizing glass fibers containing a more or less equal blend of two polyester resins, one a water-soluble, unsaturated polyester resin salt, which when cross-linked is insoluble in aromatic solvents, and the other one a water-dispersible, unsaturated polyester resin which is insoluble in the first resin. The composition also includes a plasticizer, a combination of silane coupling agents and a low molecular weight thermoplastic polymer.

U.S. Pat. No. 4,122,074 describes certain polyester aminoalkylalkoxysilane polymers and their organic acid salts. The silane-modified polyesters are formed by reacting an unsaturated polyester with an aminoalkylalkoxysilane. These polymers are used as a sizing composition to compatibilize and render adherent inorganic siliceous materials, such as glass strands, used to reinforce polyester molding resin. In U.S. Pat. No. 4,273,694 the stability of such polyester aminoalkylalkoxysilane polymers used for forming aqueous dispersions is improved by amine neutralization with strong acids. While these materials satisfy many of the requirements of a good glass size, they tend to impart insufficient stiffness to the sized fibers and exhibit too high a solubility in organic solvents making them less suitable for use as a size for glass fiber reinforcement of thickened, polymerizable polyester resins, particularly for sheet molding compound (SMC), and bulk molding compound (BMC).

To improve the stiffness of the sized glass strands and reduce the degree of extractability of the size, U.S. Pat. No. 4,340,520 describes blending certain polyalkylene glycol polymers with the prior art polyester aminoalkylalkoxysilane polymers and their acid salts. Though leading to improvements in these properties of the sized glass strands, the polyalkylene glycol in such polymer blends, exhibits a tendency to migrate when the coated strands are dried and cured. When migration of polyalkylene glycol occurs it creates a nonuniformity in the degree of cure of the size in the forming package (as measured by its solubility in organic solvents). For example, sized fiber strands proximate the exterior of the package are more cured and stiffer than sized fiber strands in the interior of the package. A different kind of a migration problem also confronts other commercial sizing compositions such as those described in U.S. Pat. No. 3,936,285, where there is a noticeable difference in the level of coating (as measured by loss on ignition) across the forming package. Nonuniformities caused by migration in the size coating and cure cause nonuniform properties of the reinforced polyester article.

It now has been discovered that the migration problem encountered when employing the two component size of U.S. Pat. No. 4,340,520 can be solved by replacing its two component polymeric mixture with a single polymer component size essentially containing a polyester aminoorganosilane and/or its acid salt wherein the polyester portion of the polymer contains a polyalkylene glycol chain segment.

DISCLOSURE OF THE INVENTION

To be commercially useful in a sizing composition for glass fibers, silylated polyester resins must be dispersible in water. The novel polyester aminoorganosilanes and particularly their acid salts employed in the size composition of the present invention provide a stable, aqueous dispersion that facilitates uniform application of the size composition to glass fibers. The sizing resists migration during drying and cures uniformly, even on large forming packages of glass strands. Rovings made using such glass strands exhibit excellent wet out and wet through characteristics when preparing resin molding compound.

The novel silyated polyester resins and their acid salts used in the polymeric size compositions of the present invention comprise Michael addition adducts of aminoorganosilanes and conjugated ethylenically unsaturated polyester precursor resins having polyalkylene glycol chain segments. The silyated polyester resins have molecular weights above 1000.

Polyester resin compositions suitable as a precursor resin for preparing a composition containing the silyated polyester resin used in preparing the polymeric size compositions of the present invention are formed by reacting, in the presence of an esterification catalyst, a conjugated ethylenically unsaturated dicarboxylic acid, and optionally a saturated dicarboxylic acid or an aromatic dicarboxylic acid, with a dihydric alcohol that includes as an essential component a small cure enhancing amount of a polyalkylene glycol. Any one of the wide variety of known ethylenically unsaturated dicarboxylic acids and dihydric alcohols can be used.

Conjugated ethylenically unsaturated dicarboxylic acids useful in forming the precursor polyester resin composition may include such acids as maleic acid, fumaric acid, mesaconic acid, citraconic acid, itaconic acid, and halo- and alkyl-derivatives of such acids, and the like. Preferred acids are maleic acid and fumaric acid. Anhydrides of these acids, where the anhydrides exist, are of course embraced under the term "acid", since polyesters obtained therefrom are essentially the same whether the acid or anhydride is utilized in the reaction.

Saturated dicarboxylic acids and/or particularly aromatic dicarboxylic acids often are utilized in combination with the unsaturated acid or anhydride in the preparation of unsaturated polyester precursor resins. Such acids increase the length of the polyester chain without adding additional cross-linking sites. Examples of useful saturated and aromatic dicarboxylic acids include succinic acid, adipic acid, suberic acid, azelaic acids, sebacic acid, phthalic acid, isophthalic acid, terephthalic acid, tetrachlorophthalic acid, hexachloroendomethylene tetrahydrophthalic acid, and the like. Preferably, an aromatic dicarboxylic acid is used. As in the case of the ethylenically unsaturated acids, the anhydrides of these acids, where the anhydrides exist, are included in the term "acid".

Ethylenically unsaturated dicarboxylic acids are employed in an amount of between about 10 mole percent to 100 mole percent of the acid component of the precursor polyester resin, although preferably the ethylenically unsaturated dicarboxylic acids comprise from about 40 mole percent to about 80 mole percent of the acid component, with the rest being a saturated dicarboxylic acid or preferably an aromatic dicarboxylic acid, or mixture thereof. Suitable precursor resins also can be formed by including a minor amount of a higher functionality acid, such as aconitic acid or trimellitic acid, as a part of the acid component.

Some dihydric alcohols useful in preparing the unsaturated polyester precursor resin composition of the present invention by reaction with the diacids include ethylene glycol, diethylene glycol, propylene glycol, 1,4-cyclohexane dimethanol, dipropylene glycol, neopentyl glycol, tetramethylene glycol, hexylene glycol and hexamethylene glycol and other diols such as, for example, 1,3-propanediol; 2-methyl propanediol; 1,4-butanediol; 2,3-butanediol; 2-butenediol; 1,5-pentanediol; 2-ethyl-1,3-hexanediol; 2,2-dimethyl-3-hydroxypropyl-2,2-dimethyl-3-hydroxypropionate and 1,3-butanediol. A minor amount of higher functional alcohols, such as glycerol, can be included as part of the dihydric alcohol component.

Although the relative amount of the above-described dihydric alcohol component and dicarboxylic acid component employed in the production of the unsaturated polyesters of the present invention are not narrowly critical, it is generally preferred to use an equal molar ratio, or more preferably a slight molar excess of dihydric alcohol component. Preferably, from about a 5 percent and more preferably from about a 10 percent, up to about a 20 percent molar excess of dihydric alcohol relative to the amount of dicarboxylic acid is used.

An essential feature of the present invention is that a portion of the dihydric alcohol reactants for preparing the precursor polyester resins of the present invention comprise homopolymers and copolymers of polyalkylene glycols such as polyethylene glycol, polypropylene glycol and the like. Polyethylene glycol is particularly preferred.

The polyalkylene glycol is included as part of the dihydric alcohol component in an amount sufficient to enhance the oxidative cure characteristic of the resulting precursor polyester resin. Coincidentally, the aqueous dispersibility of the precursor resin also is improved. Typically, to satisfy this requirement, the dihydric alcohol component should contain from about 0.2 mole percent, up to about 10 mole percent of a polyalkylene glycol. Preferably, the polyalkylene glycol component of the polyester comprises from about 0.5 mole percent of the dihydric alcohol component, up to about 5 mole percent.

As recognized by those skilled in the art, precursor polyester resins made using the above described constituents will contain a distribution of molecules of differing molecular weights and each molecule will potentially have a different distribution of ethylenically unsaturated dicarboxylic acid, saturated dicarboxylic acid, aromatic dicarboxylic acid, dihydric alcohol and polyalkylene glycol constituents which depends in part on the initial reactant formulation. The number average molecular weight of the precursor polyester resin as determined by gel permeation chromatography using a Waters Model 6000A chromatograph, Waters Styragel columns, trichloroethylene eluent and polystyrene standards is at least 1000, and preferably between about 2000 and 10,000. Using the noted reactants at the specified mole fractions may produce some molecules having no polyalkylene glycol chain segments in the polyester resin molecular distribution. On average, however, preferably at least one in ten, and more preferably at least one in four, polyester resin molecules should contain a polyalkylene glycol chain segment.

Polyalkylene glycol polymers which can be utilized as a monomer according to the present invention to prepare suitable precursor polyester resins may be all-ethylene oxide based, all-propylene oxide based, or mixed ethylene oxide/propylene oxide based polymers. A class of polyoxyalkylene glycol polymers suitable for use according to the present invention thus may be represented by the formula

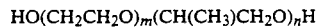

HO(CH₂CH₂O)$_m$(CH(CH₃)CH₂O)$_n$H wherein m ranges from 0 to 300, preferably 17 to 180, n ranges from 0 to 20, preferably less than 10, and m+n must total at least 8, preferably from 17 to 200.

Molecular weights of suitable polyalkylene glycol polymers can vary widely, so long as they do not become too viscous. Polyalkylene glycol polymer compositions actually used may contain small amounts of additives such as antioxidants. These polyalkylene glycol constituents have a number average molecular weight of between about 350 and 14,000, with a molecular weight between about 750 and 8000 being more usual. Polyethylene glycol is most conveniently employed as the polyalkylene glycol component. An ethylene oxide polymer which has the following approximate composition has proven to be suitable:

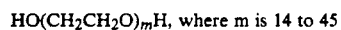

HO(CH₂CH₂O)$_m$H, where m is 14 to 45

Numerous polyethylene glycols suitable for incorporation in the polyester are available commercially. For example, a satisfactory series is sold by Union Carbide Corporation under the trade name of Carbowax. The Carbowax polyethylene glycols are understood to be polyethylene glycols (or mixtures of polyethylene glycols) having average molecular weights of about 200 or above but below about 14,000, and those containing materials having average weights between 750 and 8,000 are especially suitable for application in the practice of the present invention.

Inasmuch as the reaction of the dicarboxylic acid with the dihydric alcohol to produce unsaturated polyesters is seen to proceed in step-wise fashion, including: (a) formation of the mono-adduct of the ester, (b) condensation of carboxyl group with hydroxyl group to form polyester and water, and (c) transesterification of polyester chain ends to form higher molecular weight polyesters, a broad reaction temperature range is employed in the production of said polyesters. A preferred temperature range for the process of reacting dicarboxylic acid with dihydric alcohol to produce unsaturated polyester is from about 100° C. to about 300° C., more usually from about 150° C. to about 250° C.

The polyester resin composition can be formed by heating the dicarboxylic acid component and polyhydric alcohol components under an inert gas atmosphere until water of reaction substantially ceases to evolve, or until the mixture has reached a reasonably low acid value (e.g., 5 to 50). The unsaturated polyester resin composition useful in the process of this invention may be prepared in the presence or absence of solvents such as xylene and in the presence or absence of conventional transesterification catalysts such as tetra-alkyl titanate and p-toluene sulfonic acid. Other examples of esterification catalysts which may be used include $Bu_2SnO$, $SnCl_2$, $SnF_2$, $BuSn(OH)_3$, $BuSnCl_3$, and the like. The amount of catalyst is not critical but generally the reaction mixture contains approximately 0.1 to 0.5 percent by weight of catalyst.

The present invention is not to be limited to any particular method for preparing the precursor polyester resin and other procedures can be used. As recognized by those skilled in the art, it is possible, though generally less convenient, to prepare a precursor polyester resin composition by separately forming two polyester resins, one with polyalkylene glycol and one without any polyalkylene glycol and then blending the two resins together.

A class of polyester resins suitable for use as the precursor polyester resin of the present invention is described in U.S. Pat. No. 3,539,441, the disclosure of which is herein incorporated by reference. A precursor resin containing maleic or fumaric and phthalic acid monomer units as the dicarboxylic acid component and ethylene glycol and polyethylene glycol monomer units as the dihydric alcohol component is particularly useful.

The silylated polyester resin containing composition used in the polymeric size composition of the present invention is formed by reacting the unsaturated polyester precursor resin composition with an aminoalkylalkoxysilane preferably followed by neutralization with an acid, preferably a strong acid.

Typical of the aminoalkylalkoxysilanes suitable for use as starting materials in the present invention are those compounds represented by the structural formula:

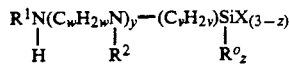

wherein $R^0$ represents an alkyl group such as a methyl, ethyl, propyl or butyl group and the like, or an aryl group such as a phenyl, naphthyl or tolyl group and the like or an aralkyl group such as a benzyl group and the like, $R^1$ and $R^2$, which may be the same or different, represent hydrogen, an alkyl group such as a methyl, ethyl or propyl group and the like or an aralkyl group such as a benzyl group and the like, X represents a hydrolyzable group such as an alkoxy group including a methoxy, ethoxy, propoxy, or 2-ethyl hexoxy group and the like, y is 0 or 1, v is an interger of 2 to 6 and preferably 3 or 4, w is an integer of 2 to 6 and preferably 2 or 3, and z is 0, 1 or 2.

Illustrative of such aminoalkylalkoxysilanes are aminomethyltriethoxysilane, gamma-aminopropyltriethoxysilane, gamma-aminopropylmethyldiethoxysilane, gamma-aminopropylethyldiethoxysilane, gamma-aminopropylphenyldiethoxysilane, N-beta (aminoethyl) gamma-aminopropyltrimethoxysilane, N-beta (aminoethyl) gamma-aminopropylmethyldimethoxysilane, delta-aminobutyltriethoxysilane, delta-aminobutylmethyldiethoxysilane, delta-aminobutylethyldiethoxysilane, delta-aminobutylphenyldiethoxysilane, N-methylaminopropyltrimethoxysilane, and the like. The preferred aminoalkylalkoxysilanes are gamma-aminopropyltriethoxysilane and N-beta (aminoethyl) gamma-aminopropyltrimethoxysilane. Branched-chain silanes (not encompassed by the above formula) such as beta-aminoisopropyltriethoxysilane are also useful in the present invention.

The aminoalkylalkoxysilane is reacted with the unsaturated polyester resin composition according to the Michael addition reaction. The Michael addition reaction is described in W. J. Hickinbottom, *Reactions of Organic Compounds*, pp. 48–55 (1957), incorporated herein by reference. Although the reaction temperature is not narrowly critical, it is preferred that the reaction be carried out at from about 0° C. to about 200° C. A more preferred temperature range is from about 20° C. to about 100° C. 60° C. to 80° C. is the most preferred temperature range.

Although the reaction may be conducted under a super- or subatmospheric pressure, atmospheric pressure is preferred unless low boiling solvents are used. The reaction is continued until the polyester resin has been silylated, on average, with at least about 0.5 mol and not more than about five (5) moles of aminoalkylalkoxysilane per mole of polyester resin, preferably between about one and three moles per mole. Excessive silylation preferably is avoided to maintain adequate stability of aqueous dispersions of the silylated resin. Reaction time generally is less than about 10 hours. As is the case with the polyalkylene glycol constituent, depending on the specific circumstances, not all molecules in the precursor polyester resin are necessarily silylated. On average, some molecules will not have undergone the Michael addition reaction.

The silylation reaction can be carried out in the presence or absence of a solvent. The amount of solvent employed, if used, is not narrowly critical and the primary purpose of the solvent is to dissolve the resin and to facilitate handling of the reaction mixture. If employed, the solvent can be either water soluble or water insoluble, depending upon the intended use. For example, the solvent can be a hydrocarbon such as, toluene, styrene, pentane, and the like; or a halohydrocarbon such as chlorobenzene or chlorotoluene; ethers such as dibutyl ether, the methyl ether of ethylene glycol and propylene glycol, or the dimethyl ether of ethylene glycol; or esters such as 1-methoxy-2-propyl acetate. For certain applications such as the commercial manufacture of sized glass fiber roving for reinforcement of unsaturated polyester resin, a water soluble solvent such as 1-methoxy-2-propanol is preferred.

Other ingredients also may be present in the Michael addition reaction mixture. For example, an organic tertriary amine such as, for example, triethylamine, tributylamine, or diethylbutylamine, may be added to the unsaturated polyester reactant prior to the Michael addition reaction in order to produce carboxyl anions at terminal or pendant carboxyl sites along the polyester chain. Consequently, more of the aminoalkylalkoxysilane is caused to react at the unsaturated portion of the polyester resin rather than forming by-product amide linked silane produced by a condensation reaction between the aminosilane and carboxyl moieties of the polyester resin. Low levels of by-product amide formation via the condensation reaction, however, have not been shown to affect the performance of the polymeric size composition of the present invention significantly.

The Michael addition reaction according to the present invention can be carried out as follows: an appropriate unsaturated precursor polyester resin, as described above, is dissolved in a solvent, such as 1-methoxy-2-propanol to provide a solution of the polyester resin. The water content of the solution should not exceed about 0.5 percent, preferably is less than 0.1 percent and most preferably the solution is essentially anhydrous. To insure anhydrous conditions, solvents can be dried over a molecular sieve prior to their use. The solution is heated to and maintained at about 75° C. and an aminoorganosilane, such as described above, then is added to the solution dropwise. The solution is agitated throughout the dropwise addition of the aminoorganosilane. After all of the aminoorganosilane has been added, the solution may be cooled to ambient temperature.

At this point, a strong acid, which also is anhydrous, can be added to the solution. According to this invention, a strong acid is any proton donor having a pKa sufficiently low to cause protonation of the Michael reaction added amino groups. The acid to be added can be dissolved in 1-methoxy-2-propanol or can be added in pure form. The amount of acid utilized is that which is necessary to react with 0 to 100 percent, and preferably with between about 10 and 80 percent, and more preferably with between 40 and 80 percent of the amino groups which have been added previously to the polyester resin by the Michael addition reaction with the aminoorganosilane. Neutralization improves the dispersibility of the silylated resin-containing composition. The neutralized, silylated resin should exhibit a pH of greater than about 2.5 at aqueous solution concentration of about 15% by weight. On average, there preferably is at least about 0.4, but not more than about 3.0, cationic ammonium moieties per silylated resin molecule. Consequently, not all silylated molecules will necessarily be neutralized (protonated).

Acids, preferably employed to provide salts according to the present invention, are strong acids having a pKa of less than about $-3$, particularly monovalent, inorganic mineral acids. The exponent pKa, which equals $-\log_{10} Ka$, is a convenient measure of acid strength. A stronger acid has more tendency to dissociate than does a weaker acid. Therefore, the stronger the acid, the higher is dissociation constant or acidity constant, and the lower its pKa. Hydrogen chloride, which is a particularly convenient strong acid, for instance, has a pKa of $-6.1$, while acetic acid has a pKa of 4.76.

In an alternate embodiment, neutralization of the silylated polyester resin-containing composition can be done at the time the polymeric size composition is prepared rather than as part of the resin composition synthesis. In this alternate embodiment, the strong acid is dissolved in the water which then is mixed with the silylated polyester resin-containing composition to form the aqueous dispersion used as the sizing composition.

Compositions containing the polyester aminoorganosilanes and their acid salts of the present invention can be utilized for various coating applications. For example, they may be used as reinforcing size binders and protective coatings for fiberglass, mineral, and metallic substrates, in the manner described in U.S. Pat. No. 4,122,074.

Particularly useful polyester aminoorganosilanes and their acid salts which can be utilized in the present invention are those polymers having molecular weights of greater than about 1000 comprising units of the formula

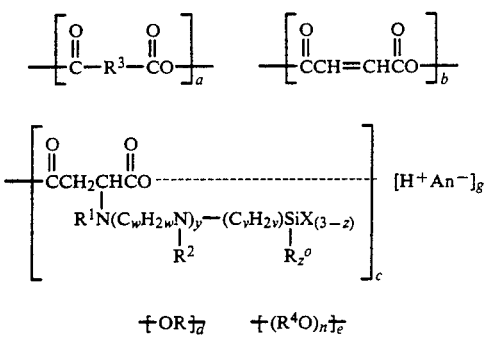

$$\{OR\}_{\overline{d}} \quad \{(R^4O)_n\}_{\overline{e}}$$

wherein R is a divalent hydrocarbon radical, and is preferably an alkylene radical having from 2 to 6 carbon atoms such as 1,2 ethylene, R° is an alkyl, aryl, or aralkyl group, $R^1$ and $R^2$, can be the same or different and represent hydrogen, an alkyl group such as methyl, ethyl or propyl and the like, or an aralkyl group such as benzy and the like, $R^3$ is an alkylene radical having from 1 to 6 carbon atoms or an aryl radical, preferably phenyl, $R^4$ is a divalent hydrocarbon radical, and is preferably 1,2-ethylene or 1,2-propylene, n is an interger of from 8 to 320 and preferably from 17 to 200, X is alkoxy, hydroxy, or divalent oxygen, and is preferably an alkoxy group having up to 8 carbon atoms such as methoxy and ethoxy, y is 0 or 1, v is an integer of from 2 to 6 and preferably 3 or 4, w is an integer of 2 to 6 and preferably 2 or 3, z is 2, 1, or preferably 0, a is 0 or is preferably a mole fraction of from 0.004 to 0.4, b and c are mole fractions individually ranging from between about 0.01 to about 0.6, d is a mole fraction ranging from 0.4 to 0.6, e is a mole fraction ranging from about 0.002 to about 0 06, or preferably a mole fraction of 0.005 to 0.03. An is an anion of a monovalent acid, and is preferably an anion of a strong acid such as hydrochloric acid and when y=0, g is a number ranging from 0 to 0.6, or preferably from 0.2 to 0.5; and when y=1, g is a number ranging from 0 to 1.2 or preferably from 0.4 to 1.0, with the provisos that the sum of d and e is greater than, equal to, or slightly less than the sum of a, b, and c, and the sum of a, b, d, e, and f equal 1.0. X is a hydrolyzable group and can be a hydroxy and/or a divalent oxygen, as indicated above, due to random hydrolysis which results in Si-OH moieties and/or to random condensation, which results in Si-O-Si bonding.

When y=1 and $R^2$ equals hydrogen in the formula for the aminoalkylalkoxysilane, the structural unit,

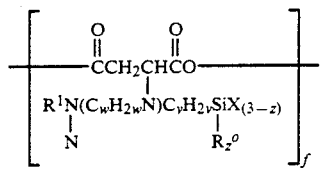

may also be included in the above formulae with the proviso that e+f is a mole fraction ranging from about 0.002 to 0.06, or preferably a mole fraction ranging from 0.005 to 0.03.

A treating solution or polymeric size composition according to the present invention can be prepared simply by mixing the resin composition containing the silylated polyester resin and/or its acid salt with water. In some cases the addition of a small amount of a nonionic surfactant may improve the stability or reduce the viscosity of the resulting dispersion and thus facilitate application of the size to glass fibers. Suitable surfactants are available commercially from Rohm & Haas Company (Triton Surface-Active Agents). Union Carbide Corporation (Tergitol NP Nonionic Surfactants), and GAF Corp. (Igepal CO Nonionic Surfactants). Other ingredients conventionally employed in compositions for sizing glass fibers to facilitate and improve pick-up, processing and the like can also be added to size compositions according to the present invention. A treating solution (dispersion) will typically contain from about 1 to about 20 percent by weight of the resin composition containing the silylated polyester resin and/or its acid salt. An aqueous dispersion containing about 10 to 15% by weight of the resin composition containing the silylated resin of the present invention, normally exhibits a viscosity of less than about 10 centistokes, maintains that viscosity for at least about 72 hours, and avoids gellation.

Glass fiber is sized according to the present invention by passing it through a bath or shower of the treating solution and then drying and curing it in air. As indicated earlier, drawn fibers contacted with the size composition typically are gathered onto a cardboard tube. The fiber wound tubes or forming packages then are heated in an oven, generally at a temperature of between about 100° to 160° C. to dry and cure the coating of size on the fibers. To adequately cure the size coating, it is necessary that the sized strands be heated in the presence of an oxygen-containing gas such as air. The cured glass fibers exhibit a uniform cure, reflected in a substantially constant level of extractability and loss on ignition (LOI) value, throughout the forming package. The cured size of the present invention typically exhibits an acetone extractable value of about 5-30%. Glass fibers treated by the process of the present invention are particularly suitable for use in preparing fiber-reinforced unsaturated polyester molding composites.

Generally there are two types of chemically thickened molding compounds which have found major utility for making articles. These are bulk molding compounds (BMC) and sheet molding compounds (SMC). Both BMC and SMC are formed commercially from a thickened, unsaturated polyester resin having a polymerization monomer generally, styrene, blended therein. Typically the polyester resin is thickened with magnesium oxide or magnesium hydroxide. A relatively low viscosity is encountered on initial mixing of the magnesium oxide with the unsaturated polyester resin-monomer solution. On aging, this mixture substantially thickens to form a compound having a viscosity much like a dough (i.e., 10 to 70 million centipoise).

The unsaturated polyester resin-based molding compound also may contain fillers such as clay, talc, calcium carbonate, silica, calcium silicate and the like. Additionally, pigments may be added to impart color to the molding compound.

Bulk molding compound (BMC) is prepared by mixing in a high shear mixer the unaged polyester resin-monomer solution having the thickening agent and the other ingredients therein along with the sized, chopped glass fiber strand or roving. This high shear mixer homogeneously disperses the glass fibers throughout the resinous phase of the composition thus forming a bulk molding compound which, after thickening on aging, can be sliced into desired shapes such as cubes and the like and placed in a press to form articles of the desired design.

Sheet molding compound (SMC) is formed by first coating the polyester resin premix, with a thickening agent therein, on a nonadhering surface such as a polyethylene sheet. A uniform film of the desired thickness is applied to the sheet as it travels on a conveyor belt. Sized chopped glass fiber roving, strand or mat is uniformly dispensed onto the polyester resin coating. A second nonadhering substrate is coated with the same polyester resin premix and brought in contact with the first polyester resin with the glass fibers thereon. Subsequent to the joining of the two polyester coatings the sandwich is kneaded with a plurality of rollers having varying configurations to uniformly distribute the glass fibers throughout the polyester premix. The sandwich then is taken up on a roll and can be used in subsequent molding operations.

The glass fiber chopped strand which is dispensed across the surface of the first polyester resin premix-coated substrate is normally formed by taking a plurality of roving packages, threading the ends of each roving package through a plurality of guide eyes into a chopping device which chops the roving to the desired length, and dispenses the glass onto the polyester resinous coated substrate in the form of chopped glass strand.

In order to form an acceptable bulk or sheet molding compound, glass fibers must have an acceptable size coated on their surface. The solubility of the glass fiber sizing composition in ethylenically unsaturated aromatic solvents (such as styrene) can affect the final properties of the molded product. Since some shear is necessary to disperse the glass fibers throughout the polyester premix, it is desirable to have a sizing composition which is more or less insoluble in the polyester resin premix to prevent filamentation of the strand, i.e., to keep the filaments in discrete bundles. Further, and especially in SMC, the individuals strands of fibers are to be homogeneously dispersed throughout the premix in order to form a uniform sheet molding compound.

If the sizing composition on the glass fibers is not properly formulated, the fibers will not disperse uniformly through the resin premix. The characteristic of the molding compound formed from the polyester and glass fibers which describes the homogeneity of the premix composite is called "wet through" or "flow through". It is desirable to have a high degree of wet through in a sheet molding compound in order that the final physical properties of the molded articles and the processability thereof be at their maximum level. On the other hand, it is also desirable that the glass fiber strands be "wet out" during compounding which means that the resin encapsulates the glass fiber strands and no bare glass is visible throughout the formed molded compound. Wet out during compounding is a measure of the apparent intimacy of contact between the resin matrix and the glass fiber strand. If the glass fibers are not immediately wet out following compounding, and it is not expected that they will wet out on aging due to the increasing of the viscosity of the molding compound, there will be adverse effects on the processability, molding characteristics and surface properties of the final molded article.

Size compositions made using the silylated polyester resin and/or their acid salts of the present invention are particularly suitable because they are readily dispersible in aqueous size formulations, they resist migration during drying and curing, and the sized fibers exhibit excellent wet through and wet out characteristics. In addition to enhancing the dispersibility of the silylated polyester resin, the polyalkylene glycol segments, also participate and assist in the curing of the polyester resin size via an oxidation mechanism.

EXAMPLES

The following specific examples illustrate the present invention. In the experimental description the following abbreviations are used and in the experimental program the following analytical protocols were employed.

Polyester Resin A: a polyester polymer composition containing about 2.5 meq/g unsaturation and containing maleic anhydride, phthalic anhydride, ethylene glycol and polyethylene glycol derived chain segments having a number average molecular weight of about 2000 and about 1 mole percent of polyethylene glycol.

Polyester Resin B: a polyester polymer composition containing about 4.3 meq/g unsaturation, and containing propylene glycol, maleic anhydride, phthalic anhydride and polyethylene glycol derived chain segments having a number average molecular weight of about 1200 and about 0.5 mole percent of polyethylene glycol.

Polyester Resin C: a polyester polymer composition containing about 3.5 meq/g unsaturation, and containing neopentyl glycol, 1,3-butanediol, maleic anhydride, phthalic anhydride and polyethylene glycol derived chain segments having a number average molecular weight of about 1500 and about 0.7 mole percent of polyethylene glycol.

Polyester Resin D: a polyester polymer composition containing polyethylene glycol, ethylene glycol, maleic anhydride (MA), and phthalic anhydride (PA), derived chain segments having a MA:PA mole ratio of 1.13:1 and a number average molecular weight of about 2000.

Silane A: 3-aminopropyltriethoxysilane

Amine titration: to determine the amount of free amine in a sample, a titration was carried out by placing a weighed sample of the silylated polyester resin composition (approximately 1 gram) into a 125 ml Erlenmeyer flask and dissolving the sample with 50 ml of glacial acetic acid. Crystal Violet indicator was added to the mixture which then was titrated to its endpoint with 0.1N perchloric acid in acetic acid. To enable the calculation of the milliequivalents of amine per gram of sample, a blank titration was carried out using a solution of Crystal Violet in 50 ml glacial acetic acid.

Preparation No. 1

A 2 liter 3-necked round bottom flask equipped with a mechanical stirrer, a heating mantle, a dropping funnel, a thermometer and a water condenser vented to a dry nitrogen bubbler was charged with 1131.5 grams of Polyester resin A dissolved in 1-methoxy-2-propanol to make about a 75% solids solution. After flushing the system with nitrogen, the resin was heated to about 70° C. Silane A (110.65 grams, 0.5 mole) then was added dropwise with stirring to the resin over a period of 10 minutes. After cooling to 60° C., a sample was withdrawn for amine titration. The titration found 0.26 meq/g free amine. The reaction mixture was cooled to 25° C. and the amine then was partially neutralized (about 60% of the titratable amine) by adding anhydrous hydrogen chloride via a subsurface dip tube (4.9 grams of HCl, total 0.137 mole HCl).

Preparation No. 2

A 2 liter 3-necked round bottom flask equipped with a mechanical stirrer, a heating mantle, a dropping funnel, a thermometer and a water condenser vented to a dry nitrogen bubbler was charged with 1038.3 grams of Polyester resin A dissolved in 1-methoxy-2-propanol to make about a 75% solids solution. After flushing the system with nitrogen for 5 minutes, the resin was heated to 75° C. A 50% by weight solution of Silane A (221.3 grams, 1.0 mole) in 1-methoxy-2-propanol then was added dropwise with stirring to the resin over a period of 1 hour. The mixture was heated for an additional 0.5 hours at 75° C., and then cooled to room temperature. A sample was withdrawn for amine titration. The titration found 0.63 meq/g free amine. The amine then was partially neutralized (about 40% of the titratable amine) by adding anhydrous hydrogen chloride dissolved in 1-methoxy-2-propanol (58 grams of 6.44 meq/g HCl, total 0.373 mole HCl).

Preparation No. 3

A 2 liter 3-necked round bottom flask equipped with a mechanical stirrer, a heating mantle, a dropping funnel, a thermometer and a water condenser vented to a dry nitrogen bubbler was charged with 849.9 grams of Polyester resin A dissolved in 1-methoxy-2-propanol to make about a 75% solids solution. After flushing the system with nitrogen, the resin was heated to about 70° C. Silane A (331.95 grams, 1.5 mole) then was added dropwise with stirring to the resin over a period of 33 minutes. A sample was withdrawn for amine titration after five minutes. The titration found 0.85 meq/g free amine. The reaction mixture was cooled to 30° C. over a period of 30 minutes and the amine then was partially neutralized (about 50% of the titratable amine) by adding anhydrous hydrogen chloride via a subsurface dip tube (22.33 grams of HCl, total 0.62 mole HCl).

Preparation No. 4

A 12 liter, 3-necked round bottom flask equipped with a mechanical stirrer, a heating mantle, a dropping funnel, a thermometer and a water condenser vented to a dry nitrogen bubbler was charged with 6639.8 grams of Polyester Resin A dissolved in 1-methoxy-2-propanol to make about a 75% solids solution. The resin was heated to about 70° C. Silane A (1415.2 grams, 6.4 moles) dissolved in 1-methoxy-2-propanol which was previously dried over a 4A molecular sieve, then was added dropwise with stirring to the resin over a period of 1.5 hours. A sample was withdrawn for amine titration. The sample was found to contain 0.51 meq/g amine. The reaction was stirred for an additional 0.5 hour at 73° C. The amine then was partially neutralized (30% of the titratable amine) by adding anhydrous hydrogen chloride dissolved in 1-methoxy-2-propanol (515 grams of 3.09 meq/g HCl, a total of 1.59 moles HCl). An additional 125.2 grams of 1-methoxy-2-propanol finally was added to the mixture.

Preparation No. 5

A 2 liter 3-necked round bottom flask equipped with a mechanical stirrer, a heating mantle, a dropping funnel, a thermometer and a water condenser vented to a dry nitrogen bubbler was charged with 979.2 grams of Polyester resin B dissolved in 1-methoxy-2-propanol. After flushing the system with nitrogen, the resin was heated to 75° C. Silane A (121.8 grams, 0.55 mole) was added dropwise with stirring to the resin over a period of about 25 minutes. The mixture was heated for an additional 25 minutes at 75° C., and then cooled. A sample was withdrawn for amine titration. The titration found 0.197 meq/g free amine. The amine then was partially neutralized (about 50% of the titratable amine) by adding anhydrous hydrogen chloride dissolved in 1-methoxy-2-propanol (62.4 grams of 2.38 meq/g HCl, total 0.148 mole HCl).

Preparation No. 6

A 2 liter 3-necked round bottom flask equipped with a mechanical stirrer, a heating mantle, a dropping funnel, a thermometer and a water condenser vented to a dry nitrogen bubbler was charged with 867.1 grams of Polyester resin C dissolved in 1-methoxy-2-propanol. After flushing the system with nitrogen, the resin was heated to about 75° C. Silane A (107.89 grams, 0.5 mole) then was added dropwise with stirring to the resin over a period of about 1 hour. The mixture was heated for about an additional 0.5 hour at 75° C., and then cooled. A sample was withdrawn for amine titration. The titration found 0.32 meq/g free amine. The amine then was partially neutralized (about 50% of the titratable amine) by adding anhydrous hydrogen chloride dissolved in 1-methoxy-2-propanol.

Preparation No. 7

A 12 liter, 3-necked round bottom flask equipped with a mechanical stirrer, a heating mantle, a dropping funnel, a thermometer and a water condenser vented to a dry nitrogen bubbler was charged with 7500 grams of Polyester Resin A dissolved in 1-methoxy-2-propanol. Silane A, (1598.5 grams, 7.2 moles) dissolved in 1-methoxy-2-propanol (1598.5 grams), which was previously dried over a 4 A molecular sieve, then was added dropwise with stirring to the resin over a period of about 1.5 hours. A sample was withdrawn for amine titration. The sample was found to contain 0.57 meq/g amine. The mixture was allowed to cool and separate portions were partially neutralized (40%, 45%, 50% and 60% of the titratable amine) by adding anhydrous hydrogen chloride. The viscosity of aqueous dispersions containing 15% by weight of the separate portions of the neutralized silylated resin-containing compositions are reported below in Table 1. The viscosity is reported in units of centistokes measured at 25° C.

TABLE 1

| Percent Neutralization | Initial Viscosity | Viscosity After 24 hour Aging |
|---|---|---|
| 40 | 10 | 5.5 |
| 45 | 6.5 | 5.5 |
| 50 | 6.0 | 5.5 |
| 60 | 5.5 | 5.5 |

EXAMPLE 1

Glass fibers drawn from a bushing were sized with aqueous dispersions of 12.5% by weight of the compositions containing silylated polyester resin salts of preparations 1, 2, 3, 5 and 6 by using a roll applicator. Sized fibers were gathered into strands and collected on a forming tube rotating at 1200 rpm. The forming packages were placed in an oven and cured under an atmosphere of air at 285° F. for 11 hours. Samples of the cured, sized glass strand were removed from various portions of the forming package (indicated as locations A, B, C, D and E) and were analyzed for percent loss on extraction (acetone for 2 hours) and percent loss on ignition (1112° F. for 2 hours). The results are presented below in Table 2.

TABLE 2

| Prep. No. | % Extractables | | | | | % Loss on Ignition | | | | |
|---|---|---|---|---|---|---|---|---|---|---|
| | A | B | C | D | E | A | B | C | D | E |
| 1* | 15.5 | 12.6 | 12.9 | 12.8 | 12.9 | 2.19 | 2.18 | 2.29 | 2.35 | 2.51 |
| 2 | — | 5.3 | 8.9 | 7.3 | 6.6 | — | 1.76 | 2.15 | 1.97 | 2.19 |
| 3 | 20.1 | 21.1 | 21.3 | 20.4 | 19.5 | 1.44 | 1.42 | 1.70 | 1.86 | 2.05 |
| 5** | 20.1 | 19.9 | 18.4 | 15.7 | 15.2 | 2.35 | 2.40 | 2.37 | 2.35 | 2.31 |
| 6 | 23.0 | 23.1 | 23.9 | 21.1 | 18.3 | 2.37 | 2.47 | 2.44 | 2.42 | 2.43 |

*size composition included 5% TRITON X-405 surfactant
**size composition included 5% Tergitol NP40 surfactant

EXAMPLE 2

Polyester Resin D was silylated to a total titratable amine content of about 0.42 mol/kg in accordance with the procedures outlined in Preparations 1 through 7 and was used without neutralization to size glass fibers in a manner similar to that described in Example 1. Samples of cured, sized glass strands were removed from various portions of the forming package and were analyzed for percent extractables and percent loss on ignition. Results are presented in Table 3.

TABLE 3

| % of package | % loss-on-ignition | % extractables |
|---|---|---|
| 91.3 | 2.17 | 23.5 |
| 73.5 | 2.26 | 22.1 |
| 50.8 | 2.43 | 25.1 |
| 33.1 | 2.36 | 25.4 |
| 15.1 | 2.33 | 24.0 |

While certain specific embodiments of the invention have been described with particularity herein, it will be recognized that various modifications thereof will occur to those skilled in the art, and it is to be understood that such modifications and variations are to be included within the purview of this application and the spirit and scope of the appended claims.

We claim:

1. A polyester resin having a molecular weight of greater than 1000 comprising a Michael addition adduct or its acid salt, formed by reaction between an aminoalkylalkoxysilane and a conjugated ethylenically unsaturated polyester resin having a polyalkylene glycol chain segment and wherein the conjugated ethylenically unsaturated polyester resin is prepared from (a) a conjugated ethylenically unsaturated dicarboxylic acid selected from the group consisting of maleic acid, fumaric acid, mesaconic acid, citraconic acid, halo- and alkyl-derivatives of said maleic, fumaric, mesaconic and citraconic acids, and mixtures thereof; (b) a saturated or aromatic dicarboxylic acid selected from the group consisting of succinic acid, adipic acid, suberic acid, azelaic acid, sebacic acid, phthalic acid, isophthalic acid, terephthalic acid, tetrachlorophthalic acid, and mixtures thereof, and (c) a dihydric alcohol selected from the group consisting of ethylene glycol, diethylene glycol, propylene glycol, 1,4-cyclohexane dimethanol, dipropylene glycol, neopentyl glycol, tetramethylene glycol, hexylene glycol, hexamethylene glycol, 1,3-propanediol, 2-methyl propanediol, 1,4-butanediol, 2,3-butanediol, 2-butenediol, 1,5-pentanediol, 2-ethyl-1,3-hexanediol, 2,2-dimethyl-3-hydroxypropyl-2,2-dimethyl-3-hydroxypropionate, 1,3-butanediol, and mixtures thereof.

2. The polyester resin of claim 1 wherein said aminoalkylalkoxysilane has the formula

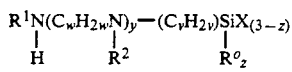

wherein $R^0$ represents an alkyl group, an aryl group, or an aralkyl group, $R^1$ and $R^2$ which can be the same or different, represent hydrogen, an alkyl group or an aralkyl group, X represents a hydrolyzable group, y is 0 or 1, v is an integer of 2 to 6, w is an integer of 2 to 6 and z is 0, 1 or 2.

3. The polyester resin of claim 2 wherein said aminoalkylalkoxysilane is selected from the group consisting of aminomethyltriethoxysilane, gamma-aminopropyltriethoxysilane, gamma-aminopropylmethyldiethoxysilane, gamma-aminopropylethyldiethoxysilane, gamma-aminopropylphenyldiethoxysilane, N-beta (aminoethyl) gamma-aminopropyltrimethoxysilane, N-beta (aminoethyl) gamma-aminopropylmethyldimethoxysilane, delta-amino-butyltriethoxysilane, delta-aminobutylmethyldiethoxysilane, delta-aminobutylethyldiethoxysilane, delta-aminobutylphenyldiethoxysilane, and N-methylaminopropyltriethoxysilane.

4. The polyester resin of claim 1 wherein said polyalkylene glycol is polyethylene glycol.

5. A polyester resin having a molecular weight of greater than 1000 comprising units of the formulae

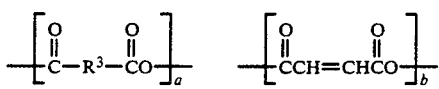

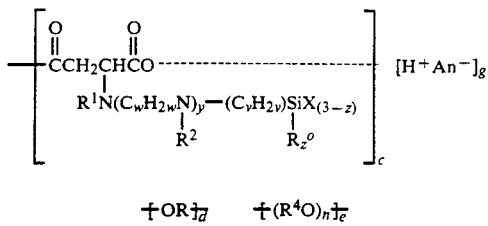

$$+OR+_d \quad +(R^4O)_n+_e$$

wherein R is a divalent hydrocarbon radical, $R^0$ is an alkyl, aryl, or aralkyl group, $R^1$ and $R^2$ can be the same or different and represent hydrogen, an alkyl group or an aralkyl group, $R_3$ is an alkylene radical or an aryl radical, $R^4$ is a divalent alkylene radical, n is an integer of from 8 to 320, X is alkoxy, hydroxy, or divalent oxygen. An is an anion of a monovalent acid, y is 0 or 1, v is an integer of from 2 to 6, w is an integer of 2 to 6, z is 2, 1, or 0, a is a mole fraction of from 0.004 to 0.4, b and c are mole fractions individually ranging from between about 0.01 to about 0.6, d is a mole fraction ranging from 0.4 to 0.6, e is a mole fraction ranging from about 0.002 to about 0.06, and when y=0, g is a number ranging from 0 to 0.6, and when y=1, g is a number ranging from 0 to 1.2, with the provisos that the sum of d and e is greater than, equal to, or slightly less than the sum of a, b, and c, and the sum of a, b, c, d, and e is 1.0.

6. The polyester resin of claim 5 which also includes a unit of the formula

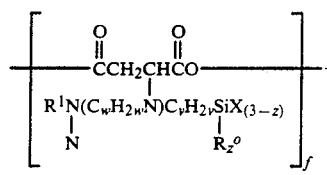

with the proviso that the sum of e and f is a mole fraction ranging from about 0.002 to 0.06.

7. The polyester resin of claim 5 wherein said monovalent acid is hydrogen chloride.

8. A polymeric size composition which contains a polyester resin according to one of claims 1, 2, 3, 4, 5, 6 or 7 dispersed in a major amount of water.

9. A polymeric size composition according to claim 8 containing a non-ionic surfactant.

10. A polymeric composition containing a silyated polyester resin or its acid salt, said composition having a number average molecular weight of greater than 1000 and prepared by reacting a conjugated ethylenically unsaturated polyester resin and an aminoalkylalkoxysilane, said conjugated ethylenically unsaturated polyester resin comprising an adduct of about an equal molar amount of a dicarboxylic acid and a dihydric alcohol wherein said dicarboxylic acid includes a conjugated unsaturated dicarboxylic acid and optionally a saturated or aromatic dicarboxylic acid or a mixture thereof, and wherein said dihydric alcohol includes about 0.2 to 10 mole percent of a polyalkylene glycol.

11. The polymeric composition of claim 10 wherein said aminoalkylalkoxysilane has the formula

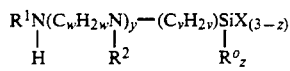

wherein $R^0$ represents an alkyl group, an aryl group, or an aralkyl group, $R^1$ and $R^2$ can be the same or different and represent hydrogen, an alkyl group or an aralkyl group, X represents a hydrolyzable group, y is 0 or 1, v is an interger of 2 to 6, w is an integer of 2 to 6 and z is 0, 1 or 2.

12. The polymeric composition of claim 11 wherein said aminoalkylalkoxysilane is selected from the group consisting of aminomethyltriethoxysilane, gamma-aminopropyltriethoxysilane, gamma-aminopropylmethyldiethoxysilane, gamma-aminopropylethyldiethoxysilane, gamma-aminopropylphenyldiethoxysilane, N-beta (aminoethyl) gamma-aminopropyltrimethoxysilane, N-beta (aminoethyl) gamma-aminopropylmethyldimethoxysilane, delta-amino-butyltriethoxysilane, delta-aminobutylmethyldiethoxysilane, delta-aminobutylethyldiethoxysilane, delta-aminobutylphenyldiethoxysilane, and N-methylaminopropyltriethoxysilane.

13. The polymeric composition of claim 10 wherein said polyalkylene glycol is polyethylene glycol.

14. The polymeric composition of claim 10 wherein said conjugated ethylenically unsaturated polyester resin is prepared from (a) a conjugated unsaturated dicarboxylic acid selected from the group consisting of maleic acid, fumaric acid, mesaconic acid, citraconic acid, halo- and alkyl-derivatives of said maleic, fumaric, mesaconic and citraconic acids, and mixtures thereof; (b) a saturated or aromatic dicarboxylic acid selected from the group consisting of succinic acid, adipic acid, suberic acid, azelaic acids, sebacic acid, phthalic acid, isophthalic acid, terephthalic acid, tetrachlorophthalic acid, and mixtures thereof, and (c) a dihydric alcohol selected from the group consisting of ethylene glycol, diethylene glycol, propylene glycol, 1,4-cyclohexane dimethanol, dipropylene glycol, neopentyl glycol, tetramethylene glycol, hexylene glycol, hexamethylene glycol, 1,3-propanediol, 2-methyl propanediol, 1,4-butanediol, 2,3-butanediol, 2-butenediol, 1,5-pentanediol, 2-ethyl-1,3-hexanediol, 2,2-dimethyl-3-hydroxypropyl-2,2-dimethyl-3-hydroxypropinate, 1,3-butanediol, and mixtures thereof.

* * * * *